Jan. 6, 1948.  J. G. JACKSON  2,433,908
REEL SIGNAL FOR MOTION PICTURE PROJECTION APPARATUS
Filed Dec. 1, 1943
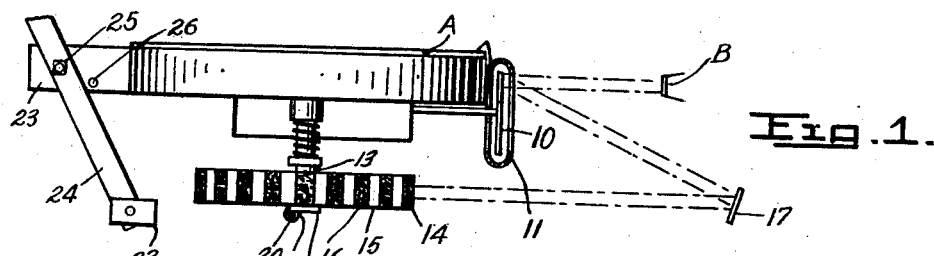
Fig. 1.
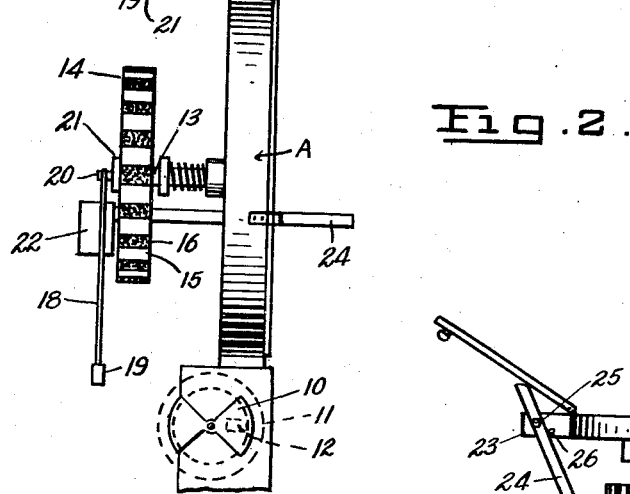
Fig. 2.
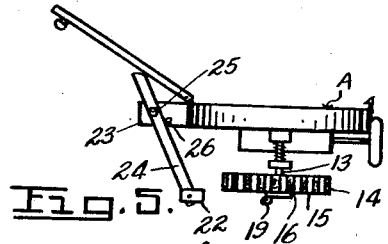
Fig. 5.
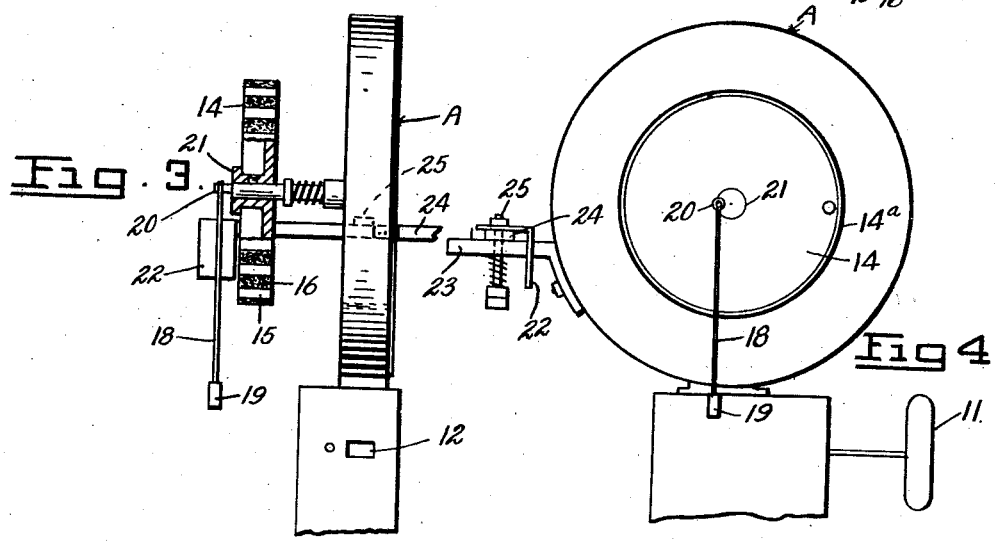
Fig. 3.
Fig. 4
INVENTOR
J. G. JACKSON
by
ATTORNEYS Patented Jan. 6, 1948

2,433,908

UNITED STATES PATENT OFFICE 2,433,908

REEL SIGNAL FOR MOTION-PICTURE PROJECTION APPARATUS

James Gordon Jackson, Port Alberni, British Columbia, Canada, assignor of one-half to James Nelson Trumpour, Port Alberni, British Columbia, Canada Application December 1, 1943, Serial No. 512,491

1 Claim. (Cl. 88—16)

This invention relates to reel signals for motion picture projectors.

It is necessary for the operator of motion picture projectors to know ahead of time when a second projector should be placed in operation upon the completion of the reel in the first projector. Up to the present time audible signals have been employed which indicate that the reel in the projector is nearing its end. However, this is accomplished by more or less complicated constructions which often break or get out of order requiring substantial repair, or squeal or chatter while the machine is running. These disadvantages can be overcome by use of a simple visual signal.

It is, therefore, an object of the present invention to provide a simple signal means for indicating that the showing of a motion picture reel is about completed.

A further object of the invention is to provide a simple signal which will be brought into operation as a result of the speed of operation of the reel.

A further object of the invention is to provide a simple visual signal which will readily attract the operator's eye at a predetermined time.

With these and other objects in view the invention generally comprises signalling means operable as a result of a predetermined speed of operation of the reel for attracting the operator's attention. The signal means embodies a rotatable drum designed to co-operate with a beam of intermittent light to give a visual signal at a predetermined time.

The invention will be clearly understood by reference to the following detailed specification taken in conjunction with the accompanying drawings.

In the drawings:

Fig. 1 is a top plan view of the top reel of a projecting machine shown in conjunction with a rotatable rear shutter and illustrating a rotatable drum associated with the reel to provide a visual signal.

Fig. 2 is a front elevation of Fig. 1 illustrating as well a swingable pendulum associated with the drum for creating an audible signal.

Fig. 3 is a front elevation similar to Fig. 2 but with the shutter removed and illustrating the signal drum partially in section.

Fig. 4 is a side elevation of Fig. 3, and

Fig. 5 is a miniature top plan view of the projecting machine illustrating the cooperation between the door of the projector and the audible signal.

Referring to the drawings, A indicates the casing of the feeding motion picture reel of a projector and B indicates the source of light which is intermittently projected through the film due to the operation of the rotatable rear shutter 10 housed within the shutter casing 11. The beam is designed to be projected through the opening 12 of the projector (Figs. 2 and 3). On the reel shaft 13 a drum 14 is mounted the circumference of which is provided with a plurality of alternating transverse light and dark lines or bands 15 and 16, the number and size of the bands being determined in accordance with the number of film frames on the reel at a predetermined time when the drum is designed to indicate the near finish of the film. Light from the source is reflected intermittently from the shutter mechanism onto a mirror or reflector 17 so positioned that it will direct such light onto the drum 14. The mirror is located in any suitable mounting and may be mounted on the shutter housing.

Normally when the reel is full, the effect of the reflected light on the drum will be seen as a series of jumbled streaks but as the reel increases in speed the spaces will form and tend to travel upwards at a fast rate of speed in the first instance, then slower, and as the reel speeds up they will tend to stand still until at a higher speed the spaces will seem to travel downwardly instead of upwardly.

As a result, therefore, of this fact the drum will provide a visual signal to indicate to the operator the length of time which will expire before the reel is completely finished. For instance, it is desirable to give the operator at least one minute's notice before the film will be finished and in the case, for instance, of reels employing 4" hubs it will be found by measurement that the circumference of the film at one minute before change-over embodies 21 frames. This is readily determined by calculation. The two wing shutter used in connection with the projector is in effect divided into four sections, two dark and two light, and accordingly by multiplying the number of frames by four it is evident that 84 spaces are required, alternately black and white, whereas for one and a half minutes of change-over time, the number of frames is 23 and 92 spaces are required. The dimensions of the drum are not critical but the larger the drum the easier it is to observe the signal from any part of the projection booth.

It is usual to employ reels having either four or five inch hubs. It is, therefore, desirable that the drum markings should be changeable and to this end the visual device is preferably made of a strip of material 14a such as paper, which may be marked properly on both sides to be used one or the other according to whether 4" or 5" hubs are involved. It is only necessary then to install the band on the drum with the proper side out to suit the projection machine in question.

It is preferable to employ the low frequency light from the projecting machine because the lower the frequency of the light, the larger the lines on the drum.

Preferably the visual signal incorporates an audible signal employed to attract the operator's attention and this is operated from the reel shaft and associated with the drum. This takes the form of a pendulum including a shaft 18 and the pendulum weight 19 which may be adjustable on its shaft, the latter being eccentrically pivoted as at 20 to a disc or collar member 21 connected to the reel shaft or on the drum itself and disposed on the outside of the drum 14. Until the reel shaft attains a predetermined speed, the pendulum will merely follow the circle of rotation of the pivot point 20, but when the speed of rotation increases to a point where it equals the natural frequency of the pendulum the latter will swing in an arc such that the weight 19 may be caused to strike an audible signal member 22 which may take any suitable form but is here illustrated as a metal member designed to give a sound similar to a chime. This may be mounted on a suitable bracket 23 connected to the reel housing and projecting laterally thereof as shown in Fig. 1. In this connection, the signal 22 may be mounted on a swingable arm 24 pivoted on the bracket 23 as at 25 and having one end projectable beyond the other side of the bracket which may serve as a means for displacing the signal when the door of the reel housing is opened and engages the projecting end of the arm 24 so as to swing the signal 22 into operative position. In other words, when the signal begins to sound by reason of being contacted by the pendulum weight 19, the projectionist may, if he wishes, swing the arm 24 about its pivot to position the audible signal 22 clear of the swinging pendulum. However, when he opens the door of the magazine for the purpose of inserting a new reel of film the door will contact the projecting end of arm 24 and will force this arm back against the stop 26 so that the audible signal 22 is positioned in normal position in the path of the pendulum weight 19. In this way, therefore, he cannot forget to set the signal as this is accomplished automatically by the opening of the door of the magazine.

When the reel has reached the predetermined speed, the pendulum is caused to swing in an arc to strike the signal member 22 intermittently and as the speed of the reel gets faster than the natural frequency of the pendulum, the arc of the swing will decrease somewhat and may decrease the intensity of the audible signal. The natural frequency of the pendulum is, of course, governed by the distance of the weight from the pivot point and by adjusting the weight 19 on the shaft 18, the frequency of swing may be set.

The audible signal provided by the pendulum can be shut off at will by the projectionist when he swings the sound device (member 22) out of range of the pendulum. Thus the projectionist must pay attention to the machine before the audible signal is eliminated. However, by referring to the visual signal the projectionist can determine immediately whether the machine can be left and whether any time may be availed of for any other duties before change over is required. In fact, the visual signal will tend to indicate at seven or eight minutes before the end of the reel and will continue to indicate until absolute change over is necessary so that by merely glancing at the visual signal, the operator can tell almost to a minute how much film is left on the reel and his attention is immediately directed to the visual signal about the critical time by the audible signal if for any reason he has not noticed the conditions prevailing by reason of the visual signal.

The signal of the present invention in all its aspects is extremely simple in character, eliminating any complicated mechanical constructions and providing a device which is positive in action, can be seen from almost any place in a projection booth, requires a minimum of power to operate, and does not employ structure which is liable to wear out or go out of repair.

What I claim as my invention is:

Motion picture projection apparatus comprising in combination a projector, a feed reel adapted to hold film for the projector, the shaft of said reel rotating at varying speeds dependent upon the amount of film on the reel, a source of light for the projector, a rotating shutter for the projector adapted periodically to interrupt the beam from the light source, said shutter having opaque sections with reflecting surfaces on the side thereof adjacent the light source, a drum mounted to rotate with the reel shaft, said drum having a plurality of parallel alternately contrasting bands extending transversely of the surface thereof, and a mirror arranged to direct periodically reflected light from the reflecting surfaces of the opaque sections of the shutter on the bands of the drum, the number and size of said bands being so related to the frequency of the light interruptions and the speed of the shaft when the reel holds a predetermined amount of film as to produce the appearance of the bands being stationary when the shaft rotates at said speed.

JAMES GORDON JACKSON.

REFERENCES CITED

The following references are of record in the file of this patent:

UNITED STATES PATENTS

| Number | Name | Date |
| --- | --- | --- |
| 1,934,484 | Camilli | Nov. 7, 1933 |
| 1,994,626 | Townsend | Mar. 19, 1935 |
| 2,119,627 | Kriek | June 7, 1938 |
| 1,078,861 | Koch | Nov. 18, 1913 |
| 1,208,646 | Power | Dec. 12, 1916 |
| 1,272,671 | Johnson | July 16, 1918 |
| 1,323,863 | Hulett | Dec. 2, 1919 |
| 1,345,813 | Walker | July 6, 1920 |
| 1,346,358 | Wenderhold | July 13, 1920 |
| 1,812,068 | Victor | June 30, 1931 |
| 2,175,938 | Fry | Oct. 10, 1935 |